(12) United States Patent
Murayama et al.

(10) Patent No.: US 8,948,904 B2
(45) Date of Patent: Feb. 3, 2015

(54) WORK PICKING SYSTEM

(75) Inventors: Takuya Murayama, Kitakyushu (JP); Jun Goto, Kitakyushu (JP); Shinji Ogasawara, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 465 days.

(21) Appl. No.: 13/313,012

(22) Filed: Dec. 7, 2011

(65) Prior Publication Data

US 2012/0215350 A1 Aug. 23, 2012

(30) Foreign Application Priority Data

Feb. 18, 2011 (JP) ................................ 2011-033086

(51) Int. Cl.
*B25J 13/02* (2006.01)
*G05B 19/418* (2006.01)
*B25J 13/08* (2006.01)
(Continued)

(52) U.S. Cl.
CPC ............... *B25J 13/08* (2013.01); *B25J 9/1612* (2013.01); *B25J 15/0004* (2013.01); *B25J 9/1697* (2013.01); *B25J 15/0028* (2013.01); *B25J 9/1682* (2013.01); *G05B 2219/39465* (2013.01); *G05B 2219/39476* (2013.01);
(Continued)

(58) Field of Classification Search
USPC .......................... 700/213, 214, 228, 229, 219; 414/403–425, 790.2, 792.9, 796.9, 414/797.8, 225.01, 226.02, 450, 453, 414/744.1–744.8, 751.1, 763, 783; 318/568.21

See application file for complete search history.

(56) References Cited

U.S. PATENT DOCUMENTS 3,888,362 A * 6/1975 Fletcher et al. ............... 414/620
4,017,721 A * 4/1977 Michaud ....................... 700/259
(Continued)

FOREIGN PATENT DOCUMENTS

EP 1418025 5/2004
EP 1442848 8/2004
(Continued)

OTHER PUBLICATIONS

Sandelin, IRIS—Flexible eye-in-hand servo gripper and tool, 2004, Machine Vision News.*
(Continued)

*Primary Examiner* — Thomas G Black
*Assistant Examiner* — Sara J Nelson
(74) *Attorney, Agent, or Firm* — Mori & Ward, LLP

(57) ABSTRACT

A work picking system according to embodiments includes a three-dimensional measuring unit, a hand, a calculating unit, a determining unit, and an instructing unit. The three-dimensional measuring unit measures a three-dimensional shape of a work that is a gripping target. The hand is provided on a terminal movable unit of a multi-axis robot and includes a mechanism that changes a distance between gripping claws and a mechanism that changes a tip end direction of the gripping claws. The determining unit determines a tip end direction of the gripping claws based on the attitude of the work calculated by the calculating unit and a direction of a rotation axis of the terminal movable unit.

7 Claims, 11 Drawing Sheets

(51) Int. Cl.
*B25J 9/16* (2006.01)
*B25J 15/00* (2006.01)

(52) U.S. Cl.
CPC ........... *G05B 2219/39488* (2013.01); *G05B 2219/39543* (2013.01); *G05B 2219/40053* (2013.01)
USPC ........... 700/213; 700/214; 700/229; 700/219; 700/247; 414/403; 414/790.2; 414/792.9; 414/769.9; 414/797.8; 414/225.01; 414/226.02; 414/450; 414/453; 414/744.1; 414/744.2; 414/751.1; 414/763; 414/783; 318/568.21

(56) References Cited

U.S. PATENT DOCUMENTS

| | | | | |
|---|---|---|---|---|
| 4,412,293 | A * | 10/1983 | Kelley et al. | 700/259 |
| 4,899,095 | A * | 2/1990 | Kishi et al. | 700/262 |
| 5,308,221 | A * | 5/1994 | Shimokoshi et al. | 414/734 |
| 5,446,835 | A * | 8/1995 | Iida et al. | 700/259 |
| 6,124,693 | A * | 9/2000 | Okanda et al. | 318/568.11 |
| 6,192,298 | B1 * | 2/2001 | Nishikawa | 700/251 |
| 6,328,523 | B1 * | 12/2001 | Watanabe et al. | 414/416.01 |
| 6,721,444 | B1 * | 4/2004 | Gu et al. | 382/154 |
| 7,177,459 | B1 * | 2/2007 | Watanabe et al. | 382/151 |
| 7,313,464 | B1 * | 12/2007 | Perreault et al. | 700/245 |
| 7,558,647 | B2 * | 7/2009 | Okazaki | 700/260 |
| 8,660,685 | B2 * | 2/2014 | Irie et al. | 700/213 |
| 2004/0086364 | A1 * | 5/2004 | Watanabe et al. | 414/416.01 |
| 2006/0104788 | A1 * | 5/2006 | Ban et al. | 414/729 |
| 2007/0177790 | A1 * | 8/2007 | Ban et al. | 382/153 |
| 2007/0274812 | A1 * | 11/2007 | Ban et al. | 414/217 |
| 2008/0082213 | A1 * | 4/2008 | Ban et al. | 700/260 |
| 2008/0181485 | A1 * | 7/2008 | Beis et al. | 382/153 |
| 2008/0240511 | A1 * | 10/2008 | Ban et al. | 382/108 |
| 2009/0060684 | A1 * | 3/2009 | Nakamoto | 414/1 |
| 2009/0116728 | A1 * | 5/2009 | Agrawal et al. | 382/154 |
| 2010/0004778 | A1 * | 1/2010 | Arimatsu et al. | 700/214 |
| 2010/0092032 | A1 * | 4/2010 | Boca | 382/103 |
| 2011/0098859 | A1 * | 4/2011 | Irie et al. | 700/259 |
| 2011/0251717 | A1 * | 10/2011 | Furukawa | 700/214 |
| 2011/0288683 | A1 * | 11/2011 | Kondo et al. | 700/260 |

FOREIGN PATENT DOCUMENTS

| | | |
|---|---|---|
| EP | 2257655 | 12/2010 |
| EP | 2422937 | 2/2012 |
| JP | 04-109815 U | 9/1992 |
| JP | 11-300670 | 11/1999 |
| JP | 2004-196548 | 7/2004 |
| JP | 2007-313624 | 12/2007 |
| JP | 2010-120141 | 6/2010 |
| JP | 2011-000669 | 1/2011 |
| JP | 2011000669 A * | 1/2011 |

OTHER PUBLICATIONS

Japanese Office Action for corresponding JP Application No. 2011-033086, May 7, 2013.
Partial European Search Report for corresponding EP Application No. 11193769.4-1712, Jul. 16, 2014.
Chinese Office Action for corresponding CN Application No. 201110436040.8, Aug. 1, 2014.
Extended European Search Report for corresponding EP Application No. 11193769.4-1712, Oct. 22, 2014.

* cited by examiner

WORK PICKING SYSTEM

CROSS-REFERENCE TO RELATED APPLICATION

This application is based upon and claims the benefit of priority of the prior Japanese Patent Application No. 2011-033086, filed on Feb. 18, 2011, the entire contents of which are incorporated herein by reference.

FIELD

The embodiments discussed herein are directed to a work picking system.

BACKGROUND

Conventionally, there is known a work picking system that performs an operation of gripping and moving works, which are randomly piled up, by a hand provided on a terminal movable unit of a multi-axis robot, that is, a pick operation.

This work picking system determines a work to be gripped next by measuring each position of works by using a two-dimensional measuring instrument or a three-dimensional measuring instrument and instructs a multi-axis robot to grip the determined work. Then, the multi-axis robot transfers the gripped work to a predetermined position.

Examples of documents related to the above-described conventional technology include Japanese Patent Laid-open Publication No. 2010-120141.

However, the above-described conventional work picking system has a problem in that the gripping attitude of a work gripped by a hand varies. Therefore, the conventional work picking system is difficult to perform an operation subsequent to the pick operation.

For example, when the gripping attitude of a work gripped by a hand varies, the attitude of the hand itself needs to be changed for changing the attitude of a work to a predetermined attitude, so that the operation of the multi-axis robot becomes complicated.

SUMMARY

A work picking system according to an aspect of embodiments includes a three-dimensional measuring unit, a hand, a calculating unit, a determining unit, and an instructing unit. The three-dimensional measuring unit measures a three-dimensional shape of a work that is a gripping target. The hand is provided on a terminal movable unit of a multi-axis robot and includes a mechanism that changes a distance between gripping claws and a mechanism that changes a tip end direction of the gripping claws. The calculating unit calculates an attitude of the work based on the three-dimensional shape measured by the three-dimensional measuring unit. The determining unit determines a tip end direction of the gripping claws based on the attitude of the work calculated by the calculating unit and a direction of a rotation axis of the terminal movable unit. The instructing unit instructs to perform an operation of gripping the work while maintaining the direction of the rotation axis of the terminal movable unit and the tip end direction of the gripping claws determined by the determining unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, explanation is given for an embodiment in a case of providing a three-dimensional measuring instrument to be fixed separately from a multi-axis robot as a first embodiment and an embodiment in a case of providing a three-dimensional measuring instrument in a multi-axis robot as a second embodiment.

Figure 1:
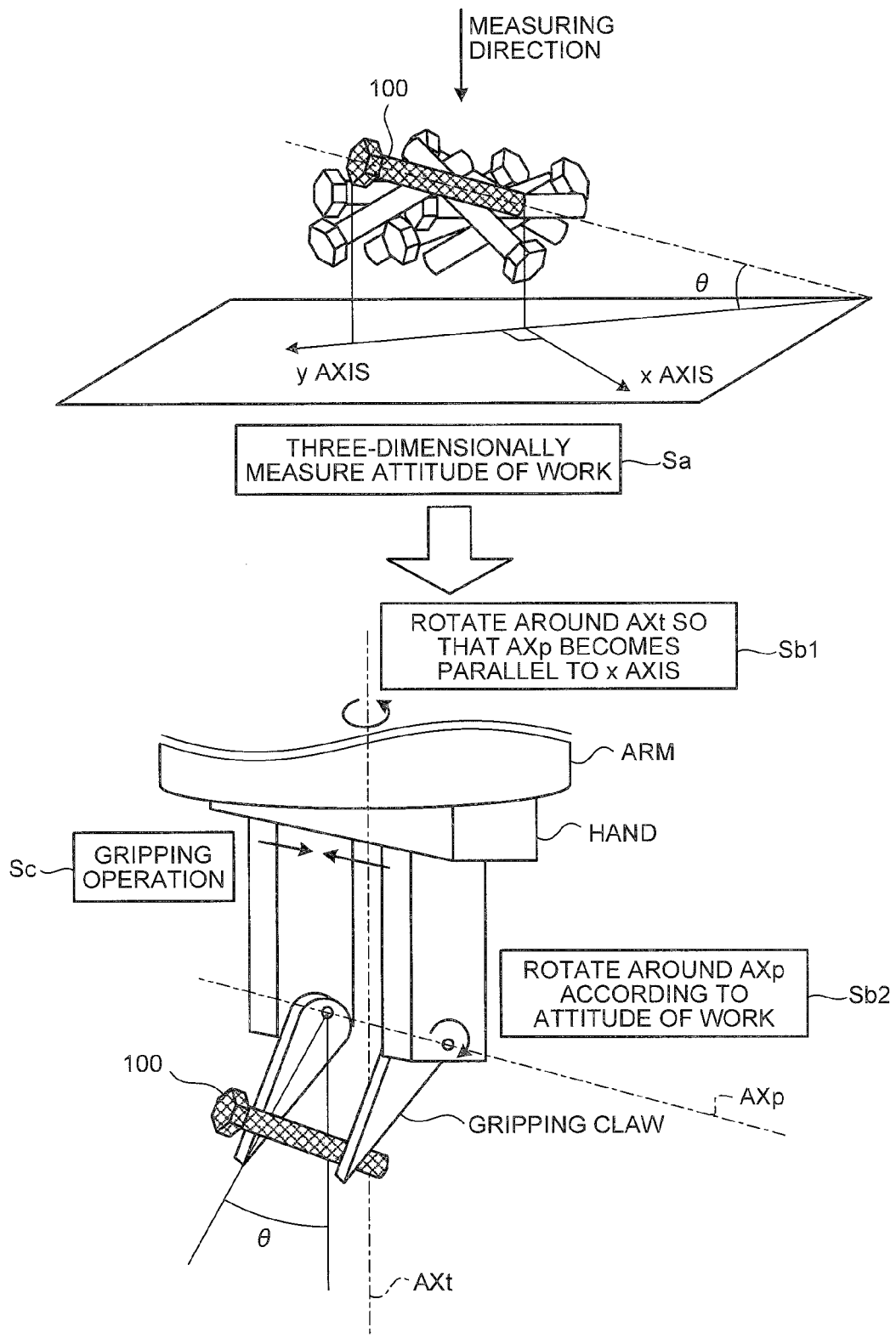
FIG. 1 is an explanatory diagram of a work picking method according to a first embodiment.

First, a work picking method according to the first embodiment is explained with reference to FIG. 1. FIG. 1 is an explanatory diagram of the work picking method according to the first embodiment. In the followings, a case in which a work 100 to be a gripping target is a bolt is explained, however, the type of the work 100 is not limited to this. For example, the work 100 may be a nut or an electronic component.

FIG. 1 illustrates a case where a measuring direction by a three-dimensional measuring instrument is vertically downward (hereinafter, described as vertical direction). Moreover, in FIG. 1, for easy understanding of the explanation, an xy coordinate system that is a Cartesian coordinate system is provided on a horizontal plane and a line obtained by projecting a reference axis (in this embodiment, an axis connecting axis centers of a bolt) of the work 100 onto the horizontal plane is a y axis.

As shown in FIG. 1, in the work picking method according to the first embodiment, an operation (pick operation) of gripping and moving the work 100 by a hand provided on a terminal movable unit (refer to an arm shown in FIG. 1) of a multi-axis robot is performed.

The hand includes a pair of gripping claws capable of changing a tip end direction and maintains a relative attitude of the gripping claws and the work 100 to a fixed attitude by appropriately changing the tip end direction of the gripping claws according to the attitude of the work 100 to be picked.

A pair of the gripping claws rotates around an axis AXp (hereinafter, described as pick axis AXp) shown in FIG. 1 to change the tip end direction of the gripping claws to any direction. The arm, to which the hand is attached, rotates around an axis AXt shown in FIG. 1, however, the axis AXt is controlled to maintain an attitude approximately parallel to the vertical direction.

That is, in the work picking method according to the first embodiment, the pick operation is performed in which the angle that the tip end direction of the gripping claws of the hand forms with the reference axis of the work 100 is constant (for example, 90°) while maintaining the rotation axis of the terminal movable unit of the multi-axis robot to be approximately parallel to the vertical direction.

Therefore, according to the work picking method in the first embodiment, the attitude of the work 100 with respect to the gripping claws can be maintained to a fixed attitude during each pick operation, so that the next work (for example, work of inserting a shaft of a bolt into a hole) related to the gripped work 100 can be easily performed.

Moreover, according to the work picking method in the first embodiment, the direction of the rotation axis of the arm, on which the hand is provided, can be maintained approximately parallel to the vertical direction, so that the arm does not easily come into contact with an obstacle (for example, a vessel in which the works 100 are piled up in bulk).

The procedure of the work picking method according to the first embodiment is explained below. As shown in FIG. 1, in the work picking method according to the first embodiment, the works 100 piled up in bulk are three-dimensionally measured, and the work 100 to be a pick target is determined and the position and the attitude of the work 100 are obtained (see Step Sa in FIG. 1). The angle between the reference axis of the work 100 and the horizontal plane is $\theta$ as shown in FIG. 1.

In this case, in the work picking method according to the first embodiment, the arm is rotated around the axis AXt so that the pick axis AXp becomes approximately parallel to the x axis shown in FIG. 1 (see Step Sb1 in FIG. 1). Moreover, in the work picking method according to the embodiment, the gripping claws are rotated around the pick axis AXp according to the attitude of the work 100 (see Step Sb2 in FIG. 1).

As shown in FIG. 1, if the angle between the tip end direction of the gripping claws and the axis AXt as the rotation axis of the arm is made equal to $\theta$ described above, the tip end direction of the gripping claws and the reference axis of the work 100 can be made orthogonal to each other.

In FIG. 1, the pick operation in which the tip end direction of the gripping claws and the reference axis of the work 100 are orthogonal to each other is exemplified, however, the pick operation may be performed so that the angle between the tip end direction of the gripping claws and the reference axis of the work 100 becomes a predetermined angle $\alpha$. In this case, it is sufficient that the gripping claws are rotated around the pick axis AXp so that the angle between the tip end direction of the gripping claws and the axis AXt becomes "$\theta+\alpha$" or "$\theta-\alpha$".

As for the execution sequence of the procedures at Step Sb1 and Step Sb2 shown in FIG. 1, any of the procedures may be performed first and the two procedures may be performed in parallel.

In this manner, in the work picking method according to the first embodiment, the work 100 is gripped by a gripping operation of narrowing the distance between a pair of the gripping claws after appropriately adjusting the tip end direction of the gripping claws according to the attitude of the work 100 (see Step Sc in FIG. 1).

Figure 2:
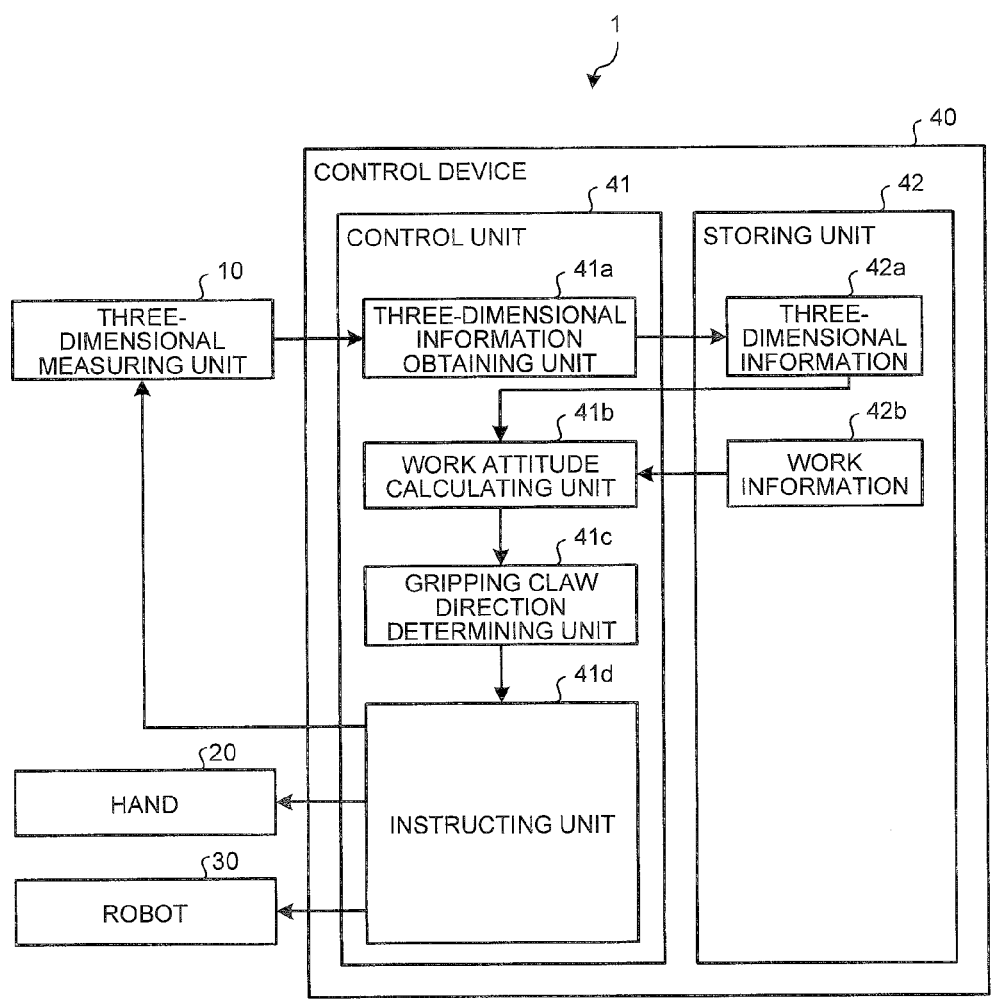
FIG. 2 is a block diagram of a work picking system according to the first embodiment.

Next, a work picking system 1 according to the first embodiment is explained. FIG. 2 is a block diagram of the work picking system 1 according to the first embodiment. As shown in FIG. 2, the work picking system 1 includes a three-dimensional measuring unit 10, a hand 20, a robot 30, and a control device 40. The hand 20 is a hand with the pick axis shown in FIG. 1.

The control device 40 includes a control unit 41 and a storing unit 42, and the control unit 41 includes a three-dimensional information obtaining unit 41a, a work attitude calculating unit 41b, a gripping claw direction determining unit 41c, and an instructing unit 41d. The storing unit 42 includes three-dimensional information 42a and work information 42b.

In FIG. 2, the hand 20 and the robot 30 are illustrated as independent components, however, the hand 20 may be included in the robot 30 and the instructing unit 41d of the control device 40 may instruct the robot 30 also for an instruction to the hand 20. Moreover, in FIG. 2, one control device 40 is illustrated, however, the control device 40 may be a plurality of independent devices and the devices may be configured to communicate with each other.

The three-dimensional measuring unit 10 is a device (three-dimensional measuring instrument) that measures a three-dimensional shape of the work 100. As the three-dimensional measuring unit 10, for example, it is possible to use a measuring unit that obtains a three-dimensional shape of an object by a scan operation using a laser slit light.

As shown in FIG. 1, the hand 20 is a hand with the pick axis that performs the gripping operation with a pair of the gripping claws capable of appropriately changing the tip end direction. The specific configuration example of the hand is described later with reference to FIG. 6A and FIG. 6B. The robot 30 is, for example, a multi-axis robot having seven axes and the hand 20 is provided on the terminal movable unit. In other words, the robot 30 is a general-purpose robot capable of replacing an end effector such as a hand.

Figure 3:
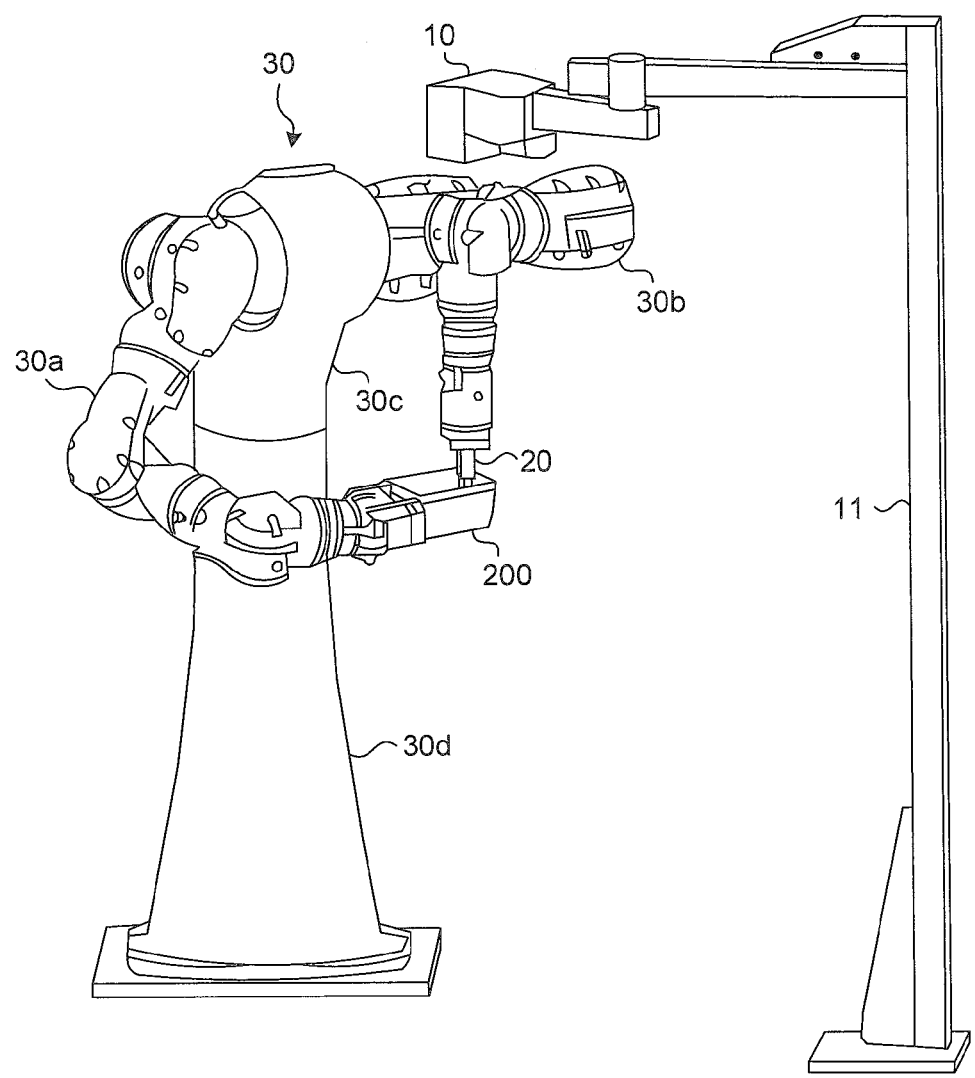
FIG. 3 is an arrangement diagram of the work picking system according to the first embodiment.

The arrangement example of the work picking system 1 according to the first embodiment and each axis of the robot 30 according to the first embodiment are explained with reference to FIG. 3 and FIG. 4, respectively. FIG. 3 is an arrangement diagram of the work picking system 1 according to the first embodiment. As shown in FIG. 3, the three-dimensional measuring unit 10 is fixed via a stand 11 (supporting unit) so that a measuring area is on the vertical direction (vertically downward) side.

Moreover, as shown in FIG. 3, the robot 30 is so-called dual-arm robot including a right arm 30a and a left arm 30b as a double arm. Each of the right arm 30a and the left arm 30b is a multi-axis robot (seven-axis robot in FIG. 3) and the above-described hand 20 (hand with the pick axis) is provided as an end effector of the left arm 30b.

A predetermined end effector is provided on the right arm 30a to grip a vessel 200 in which the works 100 are piled up in bulk. In this manner, the robot 30 performs an operation of taking out the work 100 from the vessel 200, which is gripped by the right arm 30a, by the hand 20 provided on the left arm 30b.

The robot 30 includes a mechanism of causing a trunk portion 30c, on which the right arm 30a and the left arm 30b are provided, to pivot along a horizontal plane with respect to a supporting portion 30d fixed to, for example, a floor.

Figure 4:
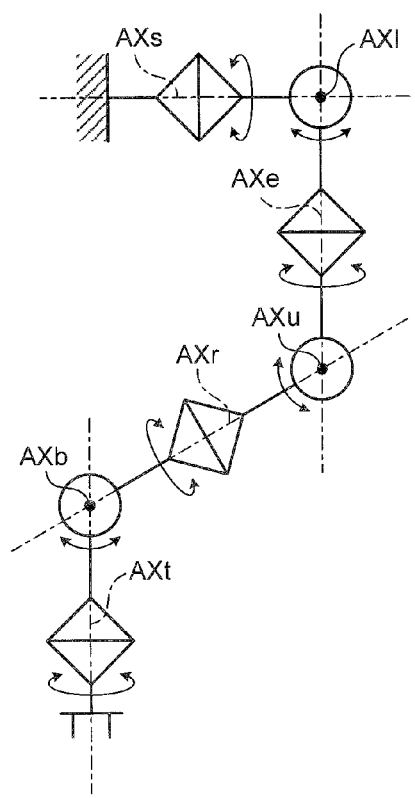
FIG. 4 is an explanatory diagram of each axis of a seven-axis robot.

FIG. 4 is an explanatory diagram of each axis of the seven-axis robot. As for the direction of the rotation axis of each joint shown in FIG. 4, the rotation axis of a joint indicated by a circle is vertical to the paper surface and the rotation axis of a joint indicated by a rectangle is parallel to the paper surface. In FIG. 4, the rotation direction of each joint is indicated by a double-headed arrow. Each of the right arm 30a and the left arm 30b shown in FIG. 3 can be the seven-axis robot shown in FIG. 4.

As shown in FIG. 4, the rotation axes of the joints are an axis AXs, an axis AX1, an axis AXe, an axis AXu, an axis AXr, an axis AXb, and the axis AXt in order from the arrangement reference plane. The axis AXt corresponds to the rotation axis of the terminal movable unit of the seven-axis robot and an end effector is provided on the terminal movable unit. The axis configuration of the right arm 30a and the left arm 30b is not limited to the configuration exemplified in FIG. 4.

The left arm 30b (see FIG. 3), on which the hand 20 (see FIG. 3) is provided, according to the first embodiment performs the pick operation by the hand 20 in a state where the axis AXt is maintained approximately parallel to the vertical direction.

Returning to the explanation of FIG. 2, the control device 40 is explained. The control unit 41 performs overall control of the control device 40. The three-dimensional information obtaining unit 41a receives measured data from the three-dimensional measuring unit 10 and causes the storing unit 42 to store therein the received measured data as the three-dimensional information 42a. The three-dimensional information 42a is information indicating the three-dimensional shape of one or a plurality of the works 100.

The work attitude calculating unit 41b performs a process of calculating the attitude of the work 100 to be a target for the pick operation based on the three-dimensional information 42a and the work information 42b. The work information 42b is information defining the three-dimensional shape and a gripped part of the work 100.

For example, when the work 100 is a bolt, a shaft near the head portion of the bolt is defined as the gripped part. Space tends to be generated near the head portion in a state where bolts are piled up in bulk, so that the shaft near the head portion of the bolt is defined as the gripped part in the above manner.

The work attitude calculating unit 41b detects the works 100 from the three-dimensional information 42a by performing a matching process using the work information 42b. Then, the work attitude calculating unit 41b determines the work 100 to be picked next from the detected works 100 and calculates the attitude of the determined work 100. The work attitude calculating unit 41b also calculates the position of the gripped part in the work 100.

Then, the gripping claw direction determining unit 41c determines the tip end direction of the gripping claws of the hand 20 based on the attitude of the work 100 calculated by the work attitude calculating unit 41b. Moreover, the gripping claw direction determining unit 41c notifies the work attitude calculating unit 41b of the determined tip end direction.

Figure 5A:
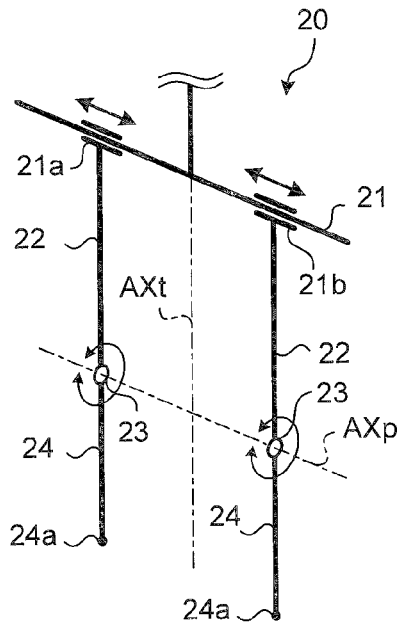
FIG. 5A to FIG. 5C are diagrams illustrating a schematic configuration of a hand.
Figure 5B:
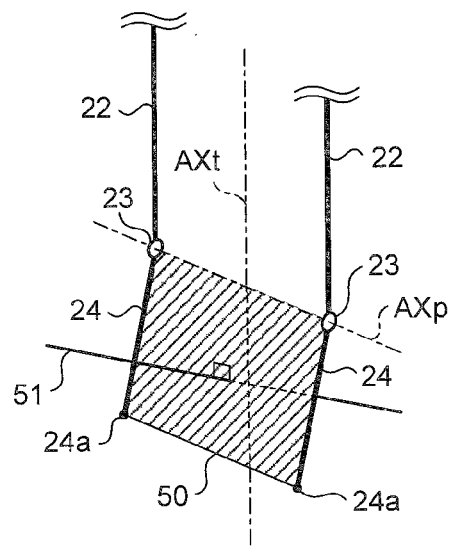
Figure 5C:
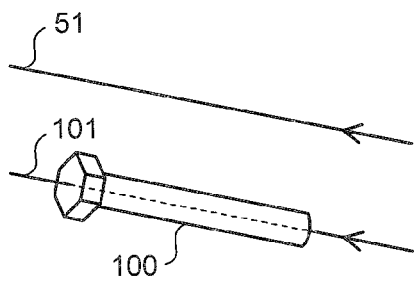

The schematic configuration of the hand 20 (hand with the pick axis) is explained with reference to FIG. 5A, FIG. 5B, and FIG. 5C. FIG. 5A to FIG. 5C are diagrams illustrating the schematic configuration of the hand 20. FIG. 5A illustrates the schematic configuration of the hand 20, FIG. 5B illustrates a state where the tip end direction of the gripping claws is changed, and FIG. 5C illustrates the relationship between a reference axis 101 in the work 100 and the tip end direction of the gripping claws.

As shown in FIG. 5A, the hand 20 includes a pair of moving units 22 that respectively include a slider 21a and a slider 21b capable of moving along a slide axis 21. A gripping claw 24 is attached to each moving unit 22 via a joint 23. The tip end of the gripping claw 24 is a point 24a.

A pair of the gripping claws 24 grips the work 100 by a pair of the moving units 22 performing an operation of moving toward each other along the slide axis 21 and a pair of the gripping claws 24 release the gripped work 100 by the moving units 22 performing an operation of moving away from each other.

Moreover, as shown in FIG. 5A, the gripping claw 24 rotates in a direction indicated by a double-headed arrow around the joint 23 as a supporting point. The line connecting two joints 23 is the above-described pick axis AXp. Moreover, FIG. 5A illustrates a state where the moving unit 22 and the gripping claw 24 are on one straight line, that is, a reference attitude of the gripping claw 24.

FIG. 5B exemplifies a state where a pair of the gripping claws 24 is rotated by a predetermined angle around the pick axis AXp from the reference attitude shown in FIG. 5A. The plane including the pick axis AXp and two points 24a (each tip end of the gripping claws 24) is defined as a plane 50 and the normal of the plane 50 is defined as a normal 51.

In this case, as shown in FIG. 5C, when the hand 20 grips the work 100, the tip end direction of the gripping claws 24 is adjusted so that the normal 51 and the reference axis 101 of the work 100 are approximately parallel to each other. With this adjustment, the work 100 can be gripped in a state where the direction of the gripping claws 24 is approximately orthogonal to the reference axis 101 of the work 100.

FIG. 5C illustrates a case where the direction of the gripping claws 24 is made approximately orthogonal to the reference axis 101 of the work 100, however, the angle between the direction of the gripping claws 24 and the reference axis 101 of the work 100 can be any angle.

Returning to the explanation of FIG. 2, the explanation of the control device 40 is continued. The instructing unit 41d indicates to the hand 20 the gripping claw direction determined by the gripping claw direction determining unit 41c. Moreover, the instructing unit 41d instructs the robot 30 to move the hand 20 in association with the pick operation.

The instructing unit 41d instructs the robot 30 to maintain the attitude in which the rotation axis (see the axis AXt in FIG. 1) of the terminal movable unit, to which the hand 20 is attached, is approximately parallel to the vertical direction. Moreover, the instructing unit 41d appropriately performs a measurement start instruction to the three-dimensional measuring unit 10. The timing of the measurement start instruction is described later with reference to FIG. 8A and FIG. 8B.

The storing unit 42 is a storage device such as a hard disk drive and a nonvolatile memory and stores therein the three-dimensional information 42a and the work information 42b. The content of the three-dimensional information 42a and the work information 42b is already explained, so that the explanation thereof is omitted here.

In FIG. 2, the control device 40 is explained as one device, however, the control device 40 may be configured as a plurality of independent devices. For example, the configuration may be such that a measurement control device that controls the three-dimensional measuring unit 10, a robot control device that controls the hand 20 and the robot 30, and an integrated control device that integrally controls the measurement control device and the robot control device communicate with each other.

Figure 6A:
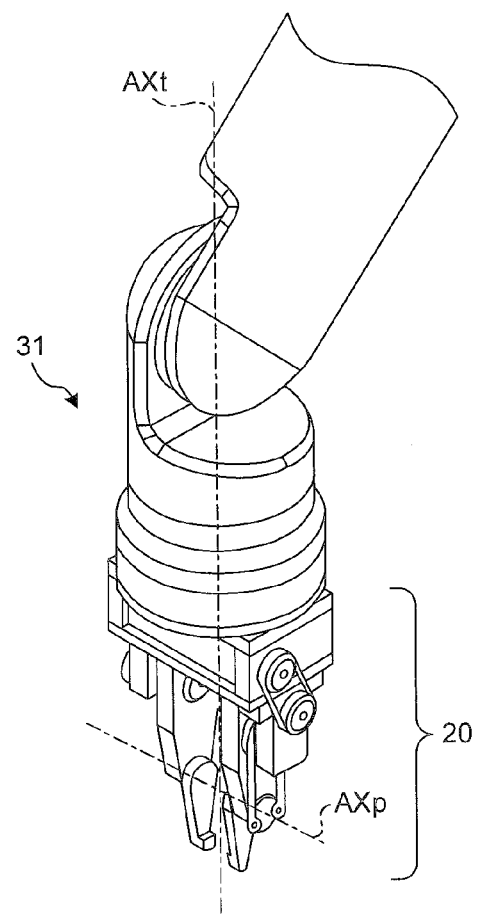
FIG. 6A and FIG. 6B are diagrams illustrating a configuration example of the hand.
Figure 6B:
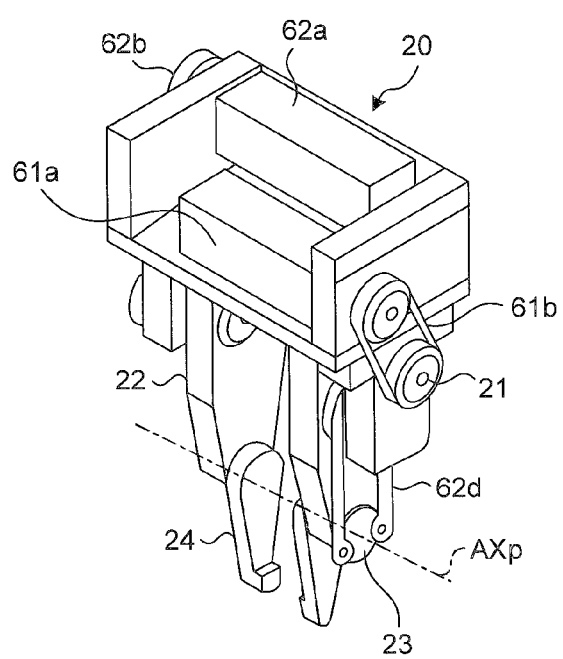

Next, the configuration example of the hand 20 (hand with the pick axis) is explained with reference to FIG. 6A and FIG. 6B. FIG. 6A and FIG. 6B are diagrams illustrating the configuration example of the hand 20. FIG. 6A illustrates the hand 20 in a state of being attached to the left arm 30b (see FIG. 3) and FIG. 6B illustrates the configuration example of the hand 20.

As shown in FIG. 6A, the hand 20 is attached to a terminal movable unit 31 of the left arm 30b. The above-described pick axis AXp in the hand 20 is approximately orthogonal to the axis AXt as the rotation axis of the terminal movable unit 31.

As shown in FIG. 6B, the hand 20 includes a first servo motor 61a used for opening and closing of the gripping claws 24 and a second servo motor 62a used for changing the tip end direction of the gripping claw 24. Moreover, the hand 20 includes a pair of the moving units 22 and a pair of the gripping claws 24.

The driving force by the first servo motor 61a is transmitted to a right and left threaded shaft 21 (an example of a slide axis 21 in FIG. 5A) via a transmission mechanism 61b. One end side and the other end side of the right and left threaded shaft 21 are threaded (right and left threads) in opposite directions.

A pair of the moving units 22 has holes, through which the right and left threaded shaft 21 passes, respectively, and the holes are threaded in the same direction. Therefore, the moving units 22 move in directions opposite to each other along the right and left threaded shaft 21 with the rotation of the right and left threaded shaft 21.

The driving force by the second servo motor 62a is transmitted to a not-shown spline shaft via a transmission mechanism 62b. Then, a link mechanism 62d, which operates with the rotation of the spline shaft, rotates circular disks 23 (an example of a joint 23 in FIG. 5A) connected to the gripping claws 24 at the pick axis AXp. Consequently, the gripping claws 24 rotate around the pick axis AXp and the tip end direction of the gripping claws 24 is changed.

In this manner, the distance between a pair of the gripping claws 24 and the tip end direction of the gripping claws 24 are changed by the servo motors, respectively, so that the work 100 can be gripped in an appropriate attitude and with an appropriate gripping force. Moreover, the thickness (for example, shaft diameter of a bolt) at the gripped part of the work 100 can be obtained.

Figure 7A:
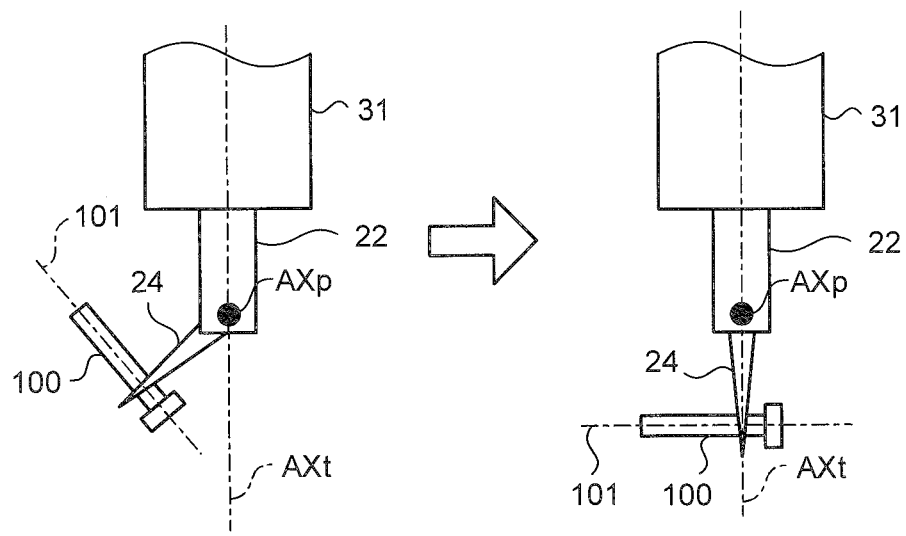
FIG. 7A and FIG. 7B are diagrams illustrating an example of a pick operation by the hand.
Figure 7B:
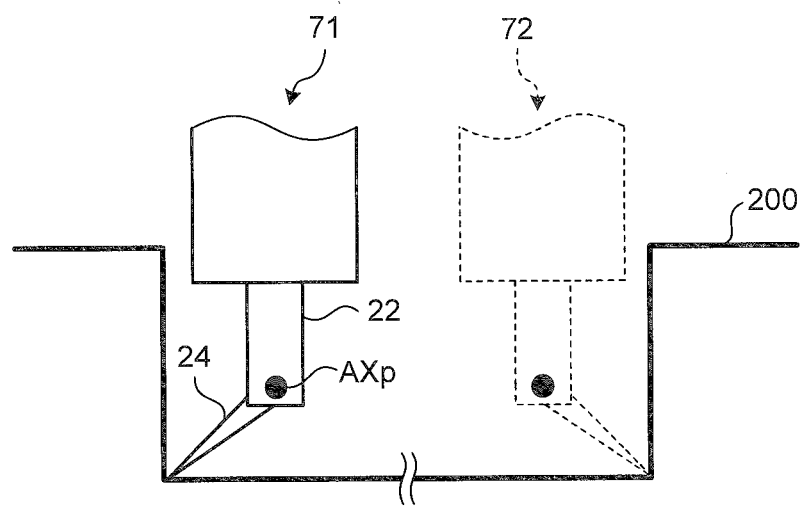

Next, the pick operation by the hand 20 (hand with the pick axis) is explained with reference to FIG. 7A and FIG. 7B. FIG. 7A and FIG. 7B are diagrams illustrating an example of the pick operation by the hand 20. FIG. 7A illustrates an operation example of the gripping claws 24 gripping the work 100 and FIG. 7B illustrates the positional relationship between the vessel 200 and the gripping claws 24.

In FIG. 7A and FIG. 7B, the pick axis AXp is vertical to the paper surface for simplifying the explanation.

As shown in FIG. 7A, in a state where the axis AXt, which is the rotation axis of the terminal movable unit 31, is made approximately parallel to the vertical direction, the gripping claws 24 grip the work 100 in an attitude orthogonal to the reference axis 101 of the work 100. Therefore, the reference axis 101 of the work 100 becomes approximately orthogonal to the axis AXt by changing the tip end direction of the gripping claws 24 gripping the work 100 to be approximately parallel to the axis AXt.

In this manner, even when the works 100 are piled up in bulk in various attitudes, the hand 20 can grip the work 100 in a fixed gripping attitude while maintaining the attitude of the terminal movable unit 31. Moreover, the hand 20 can change the attitude of the work 100 after being gripped to a fixed attitude (for example, horizontal state) in a state of maintaining the attitude of the terminal movable unit 31.

Moreover, as shown in FIG. 7B, the hand 20 can take out the work 100 located near the wall surface of the vessel 200 without the left arm 30b (see FIG. 3) and the hand 20 coming into contact with the vessel 200.

For example, when gripping the work 100 near the left-side wall surface in FIG. 7B, the tip end direction of the gripping claws 24 is changed so that the tip end side of the gripping claws 24 comes close to the left-side wall surface in a state where the hand 20 is positioned in a position 71. Moreover, when gripping the work 100 near the right-side wall surface in FIG. 7B, the tip end direction of the gripping claws 24 is changed so that the tip end side of the gripping claws 24 comes close to the right-side wall surface in a state where the hand 20 is positioned in a position 72.

Figure 8A:
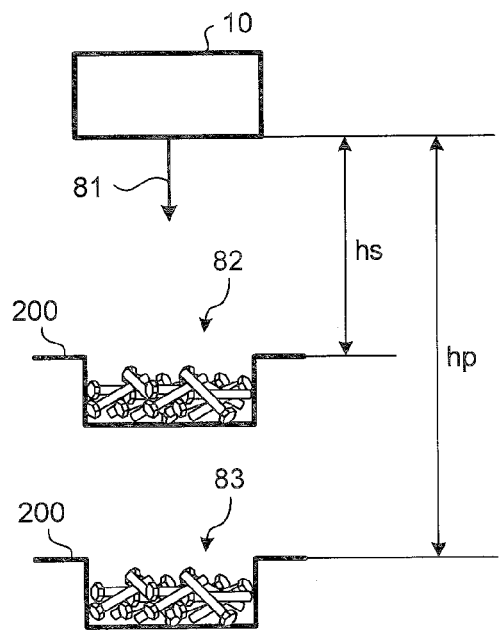
FIG. 8A and FIG. 8B are diagrams illustrating a measurement position and a pick position.
Figure 8B:
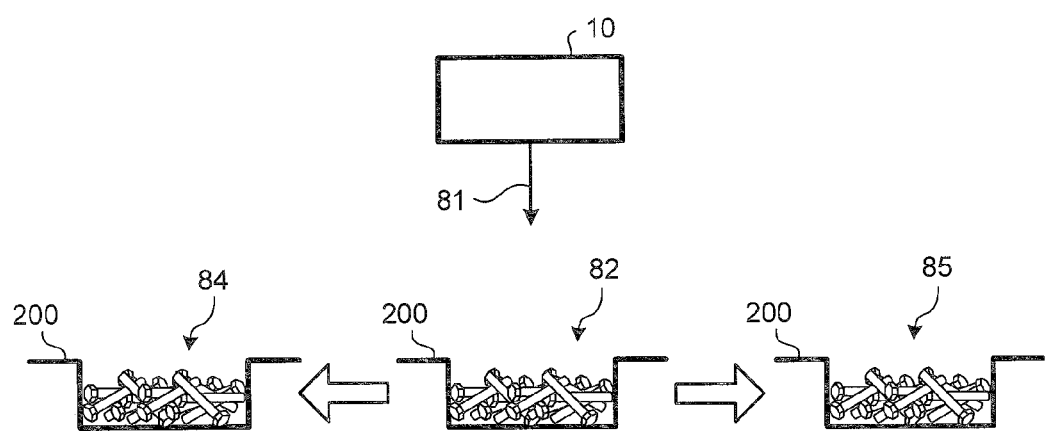

Next, explanation is given for an example of an instruction by the instructing unit 41d of the control device 40 with reference to FIG. 8A and FIG. 8B. FIG. 8A and FIG. 8B are diagrams illustrating a measurement position and a pick position. FIG. 8A illustrates a case where a measurement position and a pick position are arranged on a vertical line and FIG. 8B illustrates a case where a measurement position and a pick position are arranged on a horizontal line. Moreover, FIG. 8A and FIG. 8B each illustrate a measuring direction 81 by the three-dimensional measuring unit 10.

As shown in FIG. 8A, the instructing unit 41d instructs the right arm 30a gripping the vessel 200 to position the vessel 200 in a measurement position 82 provided in a measurement range of the three-dimensional measuring unit 10.

Next, the instructing unit 41d performs a measurement start instruction on the three-dimensional measuring unit 10. When measurement by the three-dimensional measuring unit 10 is completed, the instructing unit 41d instructs the right arm 30a to position the vessel 200 in a pick position 83 by moving the vessel 200 in the vertical direction (vertically downward).

A distance hs (distance from the three-dimensional measuring unit 10 to the reference position of the vessel 200) corresponding to the measurement position 82 is shorter than a distance hp corresponding to the pick position 83. This is for ensuring workspace of the left arm 30b that performs the pick operation while performing measurement in a distance in which a measuring accuracy by the three-dimensional measuring unit 10 is ensured.

Moreover, the pick position 83 is provided in the vertical direction (vertically downward) of the measurement position 82 for preventing displacement of the works 100 in the vessel 200.

Moreover, as shown in FIG. 8B, the vessel 200 for which measurement by the three-dimensional measuring unit 10 is completed at the measurement position 82 may be positioned in a pick position 84 or a pick position 85 by horizontally moving the vessel 200. In this case, the instructing unit 41d instructs the robot 30 to cause the trunk portion 30c shown in FIG. 3 to pivot.

In this manner, the workspace of the left arm 30b that performs the pick operation can be ensured also by horizontally moving the vessel 200.

Figure 9:
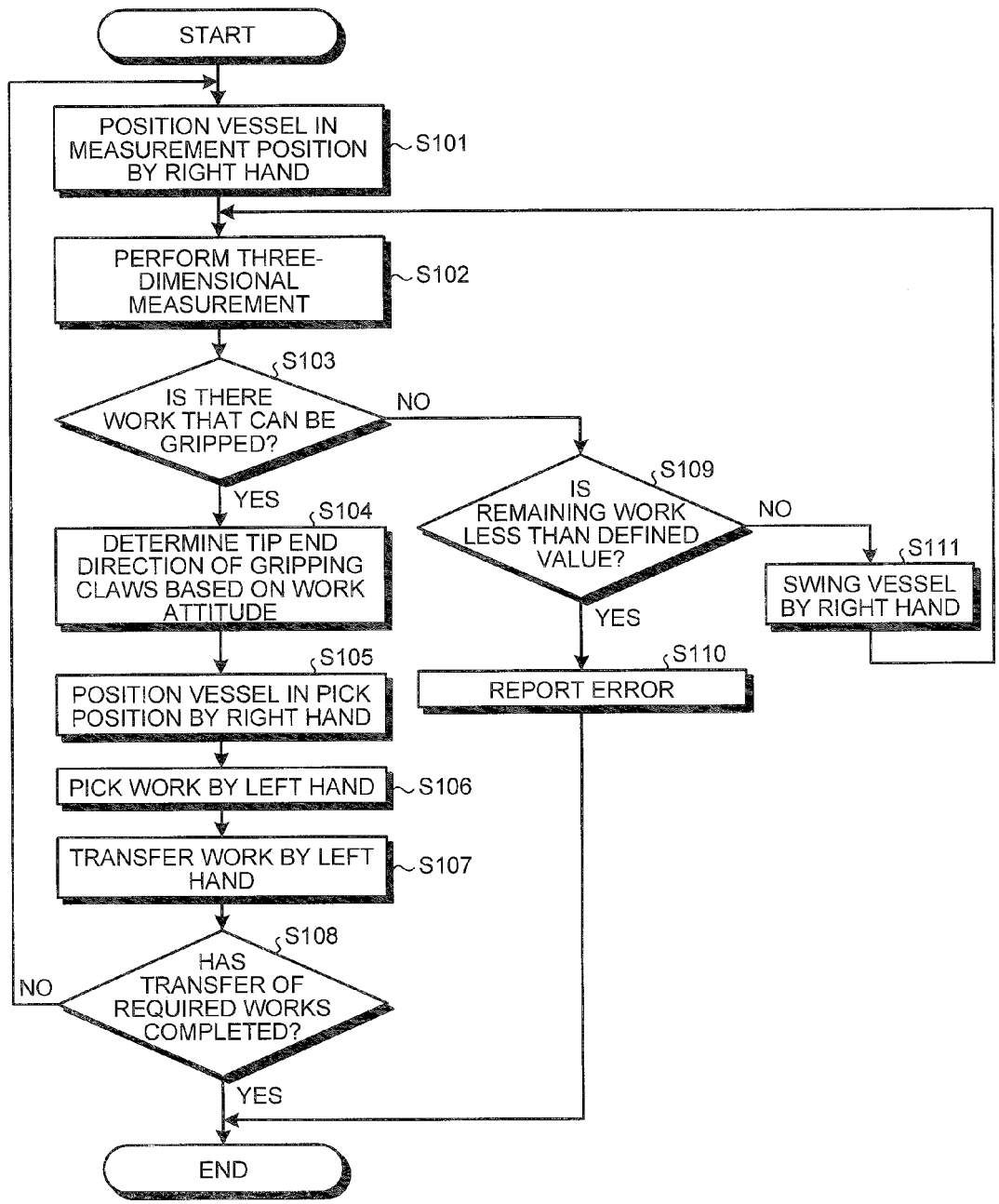
FIG. 9 is a flowchart illustrating a process procedure performed by the work picking system according to the first embodiment.

Next, the process procedure performed by the work picking system 1 according to the first embodiment is explained with reference to FIG. 9. FIG. 9 is a flowchart illustrating the process procedure performed by the work picking system 1 according to the first embodiment. In FIG. 9, a right hand indicates the hand provided on the right arm 30a in FIG. 3 and a left hand indicates the hand 20 (hand with the pick axis) provided on the left arm 30b in FIG. 3.

As shown in FIG. 9, the instructing unit 41d instructs to position the vessel 200 in a measurement position by the right hand (Step S101). Moreover, the instructing unit 41d instructs the three-dimensional measuring unit 10 to perform three-dimensional measurement (Step S102).

Next, the work attitude calculating unit 41b determines whether there is the work 100 that can be gripped (Step S103). When there is the work 100 that can be gripped (Yes at Step S103), the gripping claw direction determining unit 41c determines the tip end direction of the gripping claws in the hand 20 based on the work attitude (Step S104).

Then, the instructing unit 41*d* instructs to position the vessel 200 in a pick position by the right hand (Step S105) and instructs to grip the work 100 by the left hand (hand 20) (Step S106). Next, the instructing unit 41*d* instructs to transfer the work 100 by the left hand (Step S107) and determines whether transfer of required works has completed (Step S108).

When transfer of the required works has completed (Yes at Step S108), the process ends. On the other hand, when transfer of the required works has not completed (No at Step S108), the process at Step S101 and the following steps is repeated. The required works, for example, indicate the total number of the works 100 to be transferred for each type.

When it is determined that there is no work 100 that can be gripped at Step S103 (No at Step S103), it is determined whether a remaining work (the number or total weight of the works 100) in the vessel 200 is less than a defined value (Step S109). When the remaining work is less than the defined value (Yes at Step S109), the error is reported (Step S110) and the process ends.

On the other hand, when the determination condition at Step S109 is not satisfied (No at Step S109), the instructing unit 41*d* instructs to swing the vessel 200 by the right hand (Step S111) and the process at Step S102 and the following steps is repeated. The positions of the works 100 in the vessel 200 change by swinging the vessel 200, so that the number of the works 100 that can be gripped can be increased.

Transfer of the work 100 by the left hand (Step S107) and movement of the vessel 200 to the measurement position by the right hand (Step S101) shown in FIG. 9 may be performed in parallel.

As described above, the work picking system according to the first embodiment includes a three-dimensional measuring unit that measures a three-dimensional shape of a work as a gripping target and a hand that is provided on a terminal movable unit of a multi-axis robot and includes a mechanism that changes the distance between gripping claws and a mechanism that changes the tip end direction of the gripping claws. Moreover, the work picking system according to the first embodiment includes a calculating unit that calculates the attitude of a work based on the three-dimensional shape measured by the three-dimensional measuring unit and a determining unit that determines the tip end direction of the gripping claws based on the attitude of the work calculated by the calculating unit and a direction of a rotation axis of the terminal movable unit. Furthermore, the work picking system according to the first embodiment includes an instructing unit that instructs to perform an operation of gripping a work while maintaining the direction of the rotation axis of the terminal movable unit and the tip end direction of the gripping claws determined by the determining unit.

Therefore, according to the work picking system in the first embodiment, the work gripping attitude can be maintained to a fixed attitude without changing the attitude of the hand itself regardless of the attitude of a work to be a gripping target.

In the above first embodiment, the case of providing the three-dimensional measuring unit to be fixed separately from the multi-axis robot is explained, however, the three-dimensional measuring instrument may be provided on the multi-axis robot. In a second embodiment described below, a case where the three-dimensional measuring instrument is provided on the multi-axis robot is explained.

Figure 10:
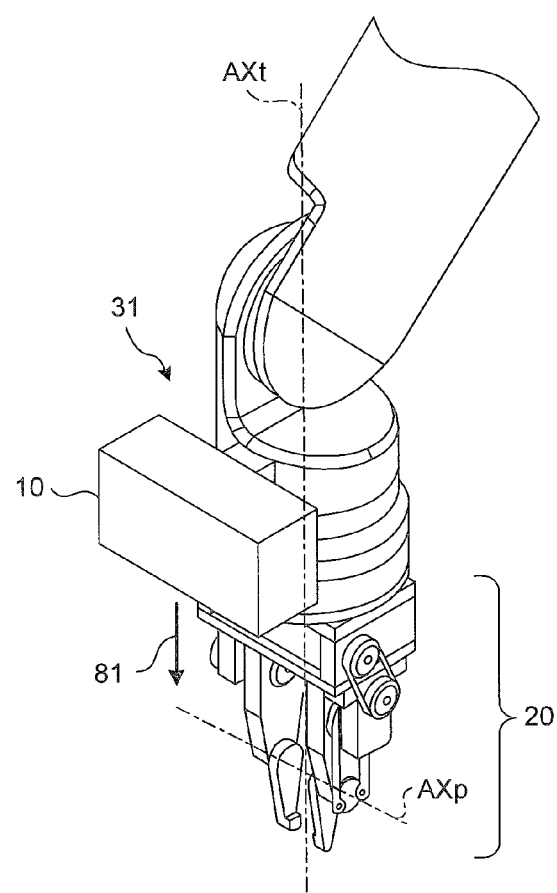
FIG. 10 is a diagram illustrating arrangement of a three-dimensional measuring unit according to a second embodiment.

FIG. 10 is a diagram illustrating arrangement of the three-dimensional measuring unit 10 according to the second embodiment. FIG. 10 corresponds to FIG. 6A and is similar to FIG. 6A except for the point that the three-dimensional measuring unit 10 is provided on the terminal movable unit 31 of the left arm 30*b*, so that explanation common to both of them is omitted below.

As shown in FIG. 10, the three-dimensional measuring unit 10 is provided on the terminal movable unit 31 to which the hand 20 is attached. The three-dimensional measuring unit 10 may be provided on a part that rotates around the axis AXt together with the hand 20 or may be provided on a part that does not rotate around the axis AXt.

Moreover, as shown in FIG. 10, the three-dimensional measuring unit 10 is fixed to the terminal movable unit 31 so that the measuring direction 81 is directed to the tip end side of the hand 20. In this manner, the operation of the robot 30 related to the pick operation can be further simplified by providing the three-dimensional measuring unit 10 on the multi-axis robot including the hand 20.

Moreover, even when the measurement range of the three-dimensional measuring unit 10 is narrow, the work 100 can be easily positioned in the measurement range.

Figure 11:
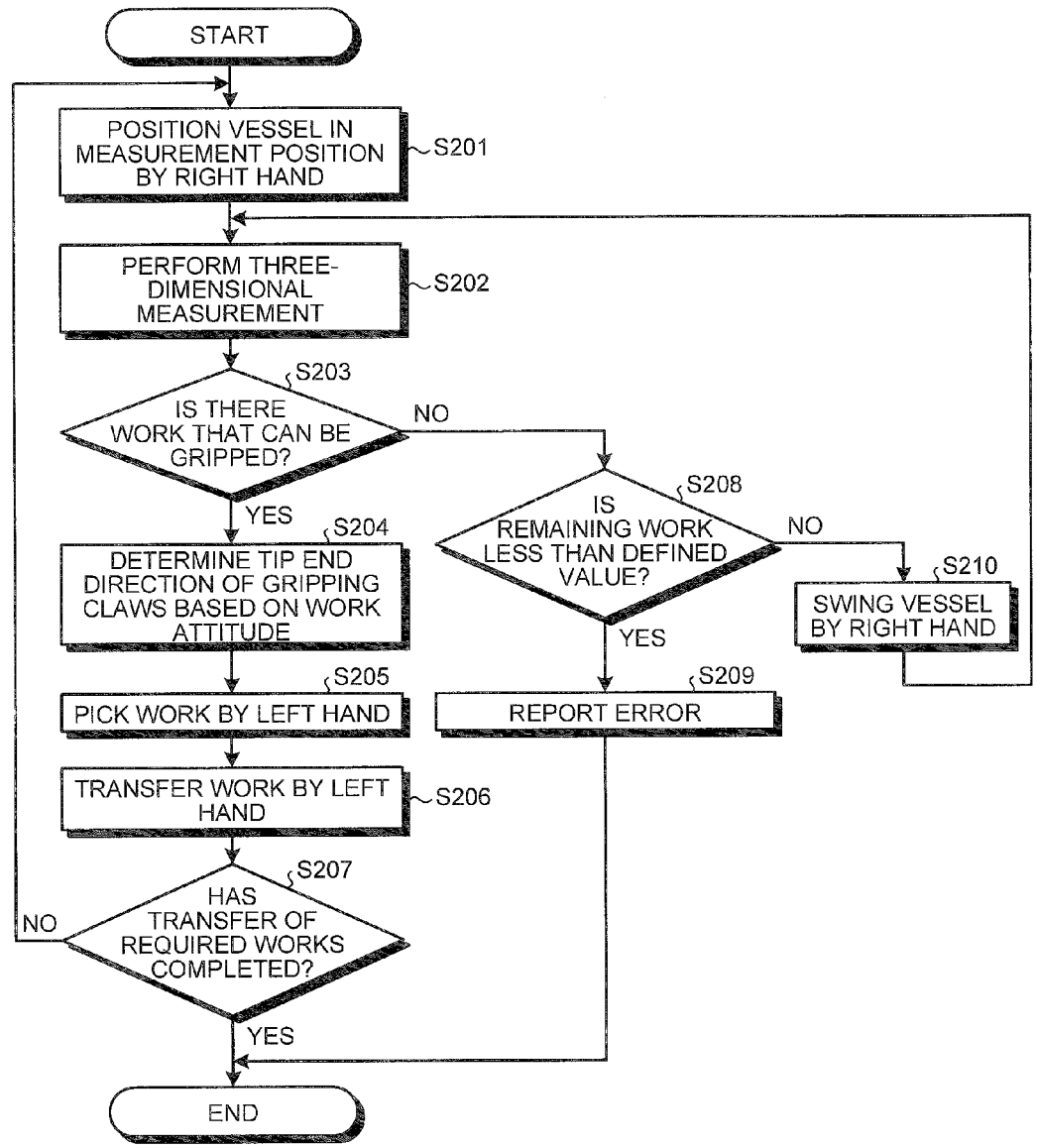
FIG. 11 is a flowchart illustrating a process procedure performed by a work picking system according to the second embodiment.

Next, the process procedure performed by the work picking system 1 according to the second embodiment is explained with reference to FIG. 11. FIG. 11 is a flowchart illustrating the process procedure performed by the work picking system 1 according to the second embodiment. A right hand and a left hand in FIG. 11 are similar to those explained with reference to FIG. 9, however, as shown in FIG. 10, the three-dimensional measuring unit 10 is provided on the left hand.

As shown in FIG. 11, the instructing unit 41*d* instructs to position the vessel 200 in a measurement position by the right hand (Step S201). Moreover, the instructing unit 41*d* instructs the three-dimensional measuring unit 10 provided on the left hand to perform three-dimensional measurement (Step S202).

Next, the work attitude calculating unit 41*b* determines whether there is the work 100 that can be gripped (Step S203). When there is the work 100 that can be gripped (Yes at Step S203), the gripping claw direction determining unit 41*c* determines the tip end direction of the gripping claws in the hand 20 based on the work attitude (Step S204).

Then, the instructing unit 41*d* instructs to grip the work 100 by the left hand (hand 20) (Step S205). Next, the instructing unit 41*d* instructs to transfer the work 100 by the left hand (Step S206) and determines whether transfer of required works has completed (Step S207).

When transfer of the required works has completed (Yes at Step S207), the process ends. On the other hand, when transfer of the required works has not completed (No at Step S207), the process at Step S201 and the following steps is repeated.

When it is determined that there is no work that can be gripped at Step S203 (No at Step S203), it is determined whether a remaining work (the number or total weight of the works 100) in the vessel 200 is less than a defined value (Step S208). When the remaining work is less than the defined value (Yes at Step S208), the error is reported (Step S209) and the process ends.

On the other hand, when the determination condition at Step S209 is not satisfied (No at Step S209), the instructing unit 41*d* instructs to swing the vessel 200 by the right hand (Step S210) and the process at Step S202 and the following steps is repeated.

In this manner, in the work picking system according to the second embodiment, the three-dimensional measuring unit is provided on the multi-axis robot to which the hand including the gripping claws capable of changing the tip end direction is attached, so that the pick operation by the multi-axis robot can be simplified. Moreover, the attitude of a work can be surely measured regardless of the size of the measurement range of the three-dimensional measuring unit.

In each of the above-described embodiments, explanation is given for the case where the vessel is gripped by the right hand of the dual-arm robot and a work in the vessel is taken out by the left hand, however, the vessel may be gripped by the left hand and the pick operation may be performed by the right hand. Moreover, the pick operation may be performed by a single-arm robot to which the hand with the pick axis is attached.

Moreover, in each of the above-described embodiments, explanation is given for the case of swinging the vessel when a remaining work in the vessel becomes less than a defined value, however, the pick operation may be performed continuously while omitting measurement by the three-dimensional measuring unit. Moreover, when there is a plurality of works that can be gripped in the vessel, the pick operation may be continuously performed while omitting measurement by the three-dimensional measuring unit.

Furthermore, in each of the above-described embodiments, the pick operation by the hand including a pair of the gripping claws is exemplified, however, the pick operation may be performed by a hand including two or more pairs of gripping claws, that is, by a hand with a plurality of pick axes. Moreover, the pick operation may be performed by a hand in which three or more gripping claws are provided with respect to one pick axis.

The control device described above can be composed of, for example, a computer. In this case, the control unit is a CPU (Central Processing unit) and the storing unit is a memory. Each function of the control unit can be realized by loading a program generated in advance to the control unit and executing the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A workpiece picking system comprising:
   a dual-arm robot which includes a trunk portion, on which a first multi-axis robot and a second multi-axis robot are provided as double arms and which includes a pivot approximately parallel to a vertical direction;
   a hand that is provided on a terminal movable unit of the first multi-axis robot and includes a mechanism that changes a distance between gripping claws and a mechanism that changes a tip end direction of the gripping claws;
   a three-dimensional measuring unit that is fixed separately from the dual-arm robot, and that measures from above a three-dimensional shape of a workpiece that is placed in a vessel gripped by the second multi-axis robot;
   a calculating unit that calculates an attitude of the workpiece based on the three-dimensional shape measured by the three-dimensional measuring unit;
   a determining unit that determines a tip end direction of the gripping claws based on the attitude of the workpiece calculated by the calculating unit and a direction of a rotation axis of the terminal movable unit; and
   an instructing unit, when measurement by the three-dimensional measuring unit is completed in a state that a distance between the three-dimensional measuring unit and the vessel is smaller than a distance that ensures workspace of the first multi-axis robot, instructs the dual-arm robot to perform an operation of positioning the vessel at a position, at which the workspace of the first multi-axis robot is ensured, by turning the trunk portion around the pivot, and then instructs, before next measurement of the three-dimensional measuring unit, the dual-arm robot to perform an operation of gripping the workpiece by the first multi-axis robot while maintaining the direction of the rotation axis of the terminal movable unit and the tip end direction of the gripping claws determined by the determining unit.

2. The workpiece picking system according to claim 1, wherein the determining unit determines a tip end direction of the gripping claws so that a normal direction of a plane including a rotation axis connecting supporting points of the gripping claws and a tip end of the gripping claws forms a predetermined angle with a reference axis in the workpiece.

3. The workpiece picking system according to claim 2, wherein
   the workpiece includes a bolt, and
   the determining unit determines a tip end direction of the gripping claws so that the normal direction is approximately parallel to an axial direction in the bolt.

4. The workpiece picking system according to claim 3, wherein the instructing unit, when the calculating unit fails in calculation of an attitude of the workpiece, instructs the second multi-axis robot to perform an operation of swinging the vessel.

5. The workpiece picking system according to claim 2, wherein the instructing unit, when the calculating unit fails in calculation of an attitude of the workpiece, instructs the second multi-axis robot to perform an operation of swinging the vessel.

6. The workpiece picking system according to claim 1, wherein the instructing unit, when the calculating unit fails in calculation of an attitude of the workpiece, instructs the second multi-axis robot to perform an operation of swinging the vessel.

7. The workpiece picking system according to claim 1, wherein the instructing unit, when a remaining amount of the workpiece in the vessel is equal to or less than a predetermined threshold, instructs to perform a pick operation of the workpiece by the first multi-axis robot without instructing to perform a new measurement by the three-dimensional measuring unit.

* * * * *